United States Patent
Min et al.

(10) Patent No.: US 7,515,567 B2
(45) Date of Patent: *Apr. 7, 2009

(54) CARRIER FREQUENCY OFFSET ESTIMATION PREAMBLE SYMBOLS

(75) Inventors: Jonathan S. Min, Buena Park, CA (US); Nabil R. Yousef, Foothill Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/833,155

(22) Filed: Aug. 2, 2007

(65) Prior Publication Data

US 2007/0268871 A1 Nov. 22, 2007

Related U.S. Application Data

(63) Continuation of application No. 10/114,800, filed on Apr. 2, 2002, now Pat. No. 7,257,102.

(51) Int. Cl.
*H04J 3/00* (2006.01)

(52) U.S. Cl. ........................................ 370/336

(58) Field of Classification Search ................. 370/336, 370/342, 344, 335; 375/233, 343, 344, 147, 375/329, 150, 142, 224, 259, 279; 455/67.11, 455/502, 323, 334

See application file for complete search history.

(56) References Cited

U.S. PATENT DOCUMENTS

| | | | | |
|---|---|---|---|---|
| 6,208,842 B1 * | 3/2001 | Henderson et al. | ........ | 455/67.11 |
| 6,996,156 B1 * | 2/2006 | Ono | ........................ | 375/147 |
| 7,139,339 B2 * | 11/2006 | Yousef et al. | ................ | 375/344 |
| 7,257,102 B2 * | 8/2007 | Min et al. | .................... | 370/336 |
| 7,308,053 B2 * | 12/2007 | Yousef et al. | ................ | 375/344 |

* cited by examiner

*Primary Examiner*—Wing F Chan
*Assistant Examiner*—Prenell P Jones
(74) *Attorney, Agent, or Firm*—Garlick Harrison & Markison; Shayne X. Short

(57) ABSTRACT

Carrier frequency offset (CFO) estimation from preamble symbols. Any communication receiver may be adapted to perform the CFO estimation. The CFO estimation is performed using a low complexity, high accuracy CFO estimation method. The operation may be described as follows: each element of a received sequence is divided by the corresponding preamble element, the resulting sequence is divided into N subgroups, and each subgroup is then averaged. The phase differential of the resulting sequence is computed, averaged, and used to compute an estimate of the carrier frequency offset. This approach to performing CFO estimation is of relatively high estimation accuracy and of relatively low computational complexity.

20 Claims, 14 Drawing Sheets

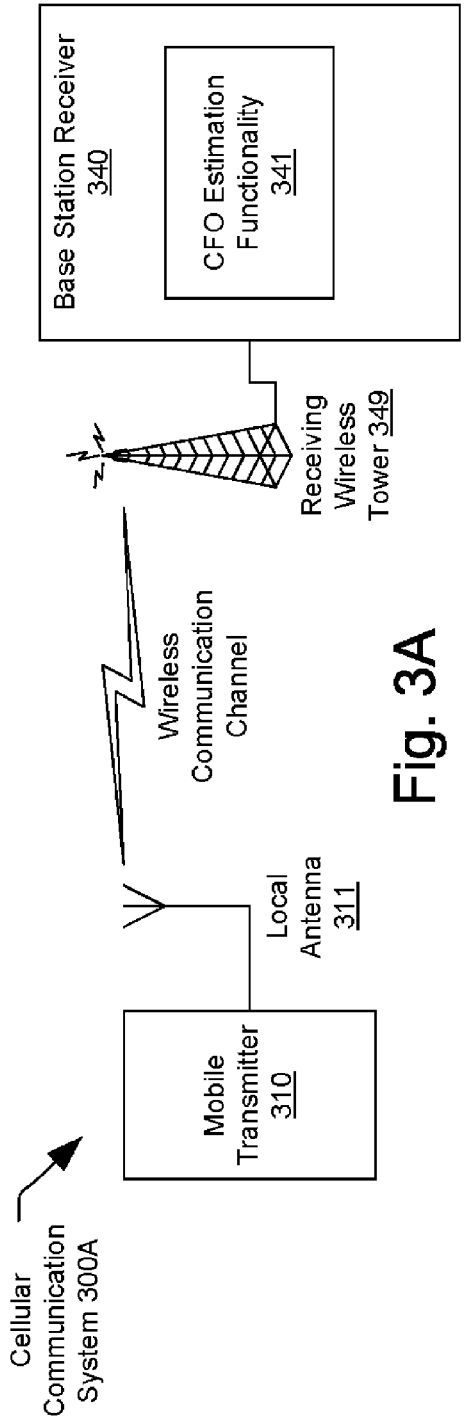
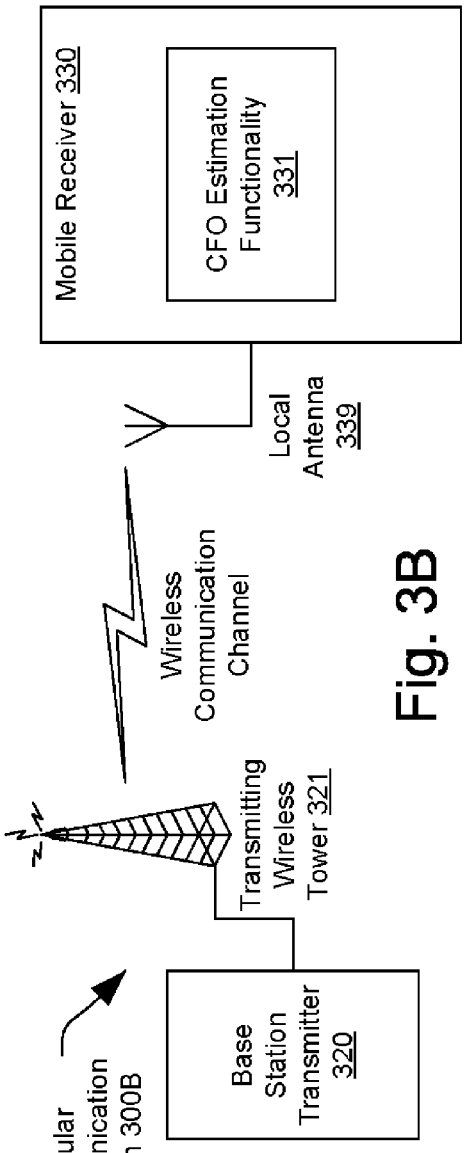

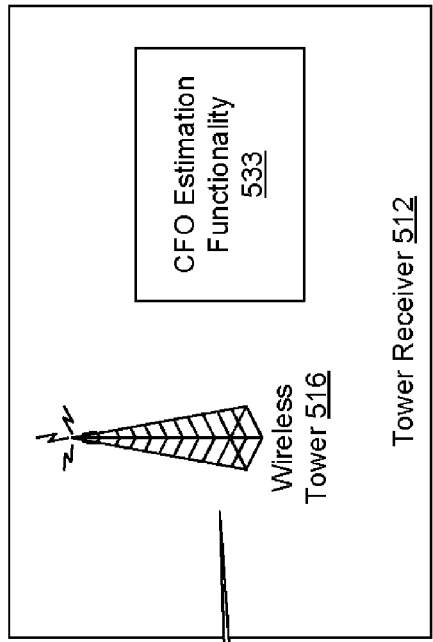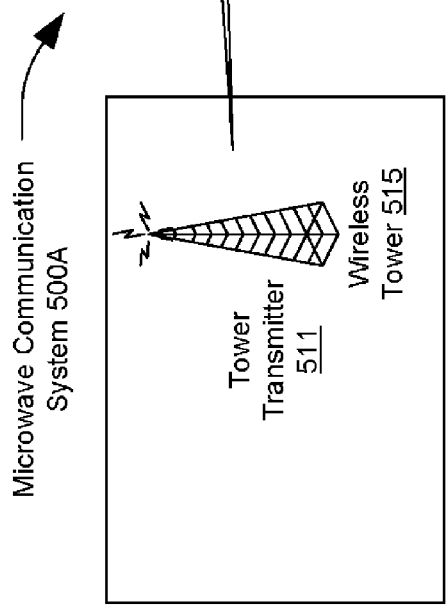
Fig. 5A
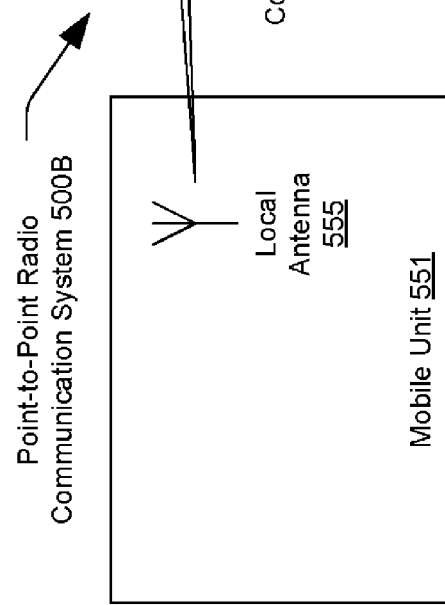
Fig. 5B

CARRIER FREQUENCY OFFSET ESTIMATION PREAMBLE SYMBOLS

CROSS REFERENCE TO RELATED PATENTS/PATENT APPLICATIONS

Continuation Priority Claim, 35 U.S.C. § 120

The present U.S. Utility patent application claims priority pursuant to 35 U.S.C. § 120, as a continuation, to the following U.S. Utility Patent Application which is hereby incorporated herein by reference in its entirety and made part of the present U.S. Utility patent application for all purposes:

U.S. Utility application Ser. No. 10/114,800, entitled "CARRIER FREQUENCY OFFSET ESTIMATION FROM PREAMBLE SYMBOLS," filed Apr. 2, 2002, pending.

BACKGROUND OF THE INVENTION

1. Technical Field of the Invention

The invention relates generally to communication systems; and, more particularly, it relates to communication receivers.

2. Description of Related Art

Data communication systems have been under continual development for many years. There is oftentimes difficulty in accommodating the offset of operational frequencies between various devices within the communication system. Carrier frequency offsets (CFOs) are very common in data communications systems. When there is a frequency offset between a transmitter and a receiver within a communication system, there may be significant degradation in performance. The undesirable degradation in performance may result in an inability to demodulate and decode received data.

In order to correct for CFOs, an accurate estimate of the CFO is needed. In packet systems, a known preamble sequence is transmitted with each data packet. The received sequence and the known preamble are usually used at the receiver to estimate the CFO. The prior art includes a number of various methods and approaches that may be used to achieve a CFO. However, these prior art methods and approaches typically involve a high degree of computational complexity. In addition, these prior art methods and approaches often fail to provide for a high degree of accuracy. As such, accurate CFOs may typically not be achieved in most prior art communication systems. This results in a failure to achieve optimal performance and accurate system operation.

One particular type of communication system, a cable modem (CM) communication system, has been under continual development for the last several years. There has been development to try to provide for improvements in the manner in which communications between the CM users and a cable modem termination system (CMTS) is performed. Many of these prior art approaches seek to perform and provide broadband network access to a number of CM users.

CM communication systems are realized when a cable company offers network access, typically Internet, access over the cable. This way, the Internet information can use the same cables because the CM communication system puts downstream data, sent from the Internet to an individual computer having CM functionality, into a communication channel having a 6 MHz capacity. The reverse transmission is typically referred to as upstream data, information sent from an individual back to the Internet, and this typically requires even less of the cable's bandwidth. Some estimates say only 2 MHz are required for the upstream data transmission, since the assumption is that most people download far more information than they upload.

Putting both upstream and downstream data on the cable television system requires two types of equipment: a cable modem on the customer end and the CMTS at the cable provider's end. Between these two types of equipment, all the computer networking, security and management of Internet access over cable television is put into place. This intervening region may be referred to as a CM network segment, and a variety of problems can occur to signals sent across this CM network segment.

One particular deficiency that may arise within the CM network segment is the undesirable introduction of a CFO in the expected clock frequency sent from the CMs within the CM communication system to the CMTS. There do exist some approaches in the prior art to try to estimate this CFO, but these prior art approaches typically fail to provide an efficient solution. As in the general prior art application of trying to perform CFO estimation, these prior art methods and approaches typically involve a high degree of computational complexity. In addition, these prior art methods and approaches often fail to provide for a high degree of accuracy.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 3A is a system diagram illustrating an embodiment of a cellular communication system that is built according to the present invention.

FIG. 3B is a system diagram illustrating another embodiment of a cellular communication system that is built according to the present invention.

FIG. 5A is a system diagram illustrating an embodiment of a microwave communication system that is built according to the present invention.

FIG. 5B is a system diagram illustrating an embodiment of a point-to-point radio communication system that is built according to the present invention.

DETAILED DESCRIPTION OF THE INVENTION

Figure 1:
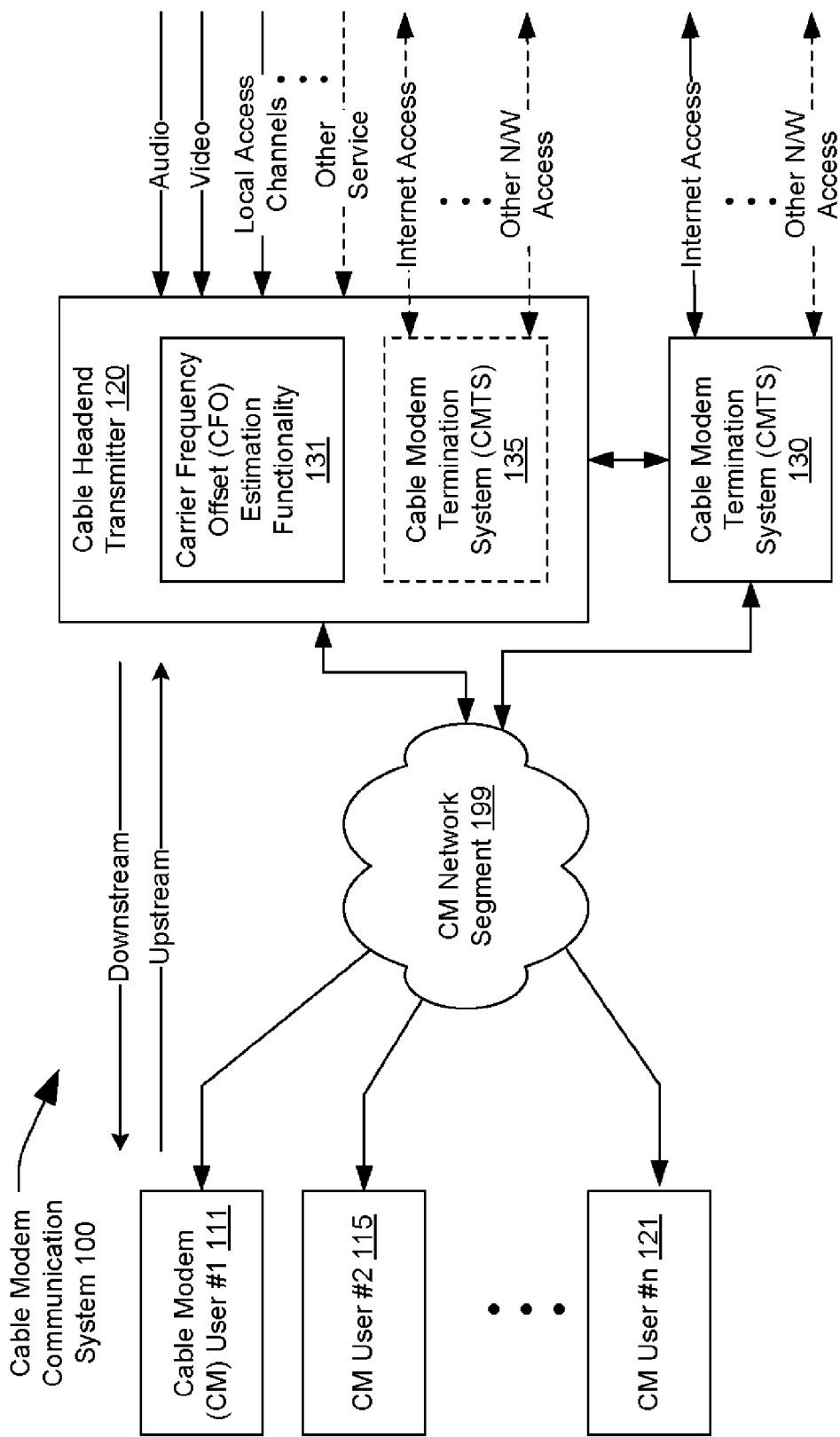
FIG. 1 is a system diagram illustrating an embodiment of a cable modem (CM) communication system that is built according to the present invention.

FIG. 1 is a system diagram illustrating an embodiment of a CM communication system 100 that is built according to the present invention. The CM communication system includes a number of CMs (shown as a CM user #1 111, a CM user #2 115, ..., and a CM user #n 121) and a CMTS 130. The CMTS 130 is a component that exchanges digital signals with CMs on a cable network.

Each of a number of CM users, shown as the CM user #1 111, the CM user #2 115, ..., and the CM user #n 121, is able to communicatively couple to a CM network segment 199. A number of elements may be included within the CM network segment 199, as understood by those persons having skill in the art. For example, routers, splitters, couplers, relays, and amplifiers may be contained within the CM network segment 199 without departing from the scope and spirit of the invention.

The CM network segment 199 allows communicative coupling between a CM user and a cable headend transmitter 120 and/or a CMTS 130. In some embodiments, a cable CMTS is in fact contained within a headend transmitter. In other embodiments, a cable CMTS is located externally with respect to a headend transmitter. For example, the CMTS 130 may be located externally to a cable headend transmitter 120. In alternative embodiments, a CMTS 135 may be located within the cable headend transmitter 120. The CMTS 130 may be located at a local office of a cable television company or at another location within a CM communication system. In the following description, the CMTS 130 is used for illustration; yet, those persons having skill in the art will appreciate that the same functionality and capability as described for the CMTS 130 may equally apply to embodiments that alternatively employ the CMTS 135. The cable headend transmitter 120 is able to provide a number of services including those of audio, video, local access channels, as well as any other service known in the art of cable systems. Each of these services may be provided to the one or more CM users 111, 115, ..., and 121.

In addition, through the CMTS 130, the CM users 111, 115, ..., 121 are able to transmit and receive data from the Internet, ..., and/or any other network to which the CMTS 130 is communicatively coupled. The operation of a CMTS, at the cable-provider's head-end, may be viewed as providing many of the same functions provided by a digital subscriber line access multiplexor (DSLAM) within a digital subscriber line (DSL) system. The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users, and typically control servers for a protocol called Data Over Cable Service Interface Specifications (DOCSIS), the major standard used by U.S. cable systems in providing Internet access to users.

The downstream information flows to all of the connected CM users 111, 115, ..., 121; this may be viewed to be in a manner that is similar to that manner within an Ethernet network. The individual network connection, within the CM network segment 199, decides whether a particular block of data is intended for it or not. On the upstream side, information is sent from the CM users 111, 115, ..., 121 to the CMTS 130; on this upstream transmission, the users within the CM users 111, 115, ..., 121 to whom the data is not intended do not see that data at all. As an example of the capabilities proffered by a CMTS, the CMTS will enable as many as 1,000 users to connect to the Internet through a single 6 MHz channel. Since a single channel is capable of 30-40 megabits per second of total throughput, this means that users may see far better performance than is available with standard dial-up modems. Embodiments implementing the present invention are described below and in the various Figures that show the data handling and control within one or both of a CM and a CMTS within a CM system that operates by employing SCDMA (Synchronous Code Division Multiple Access).

The CMs of the CM users 111, 115, ..., 121 and the CMTS 130 communicate synchronization information to one another to ensure proper alignment of transmission from the CM users 111, 115, ..., 121 to the CMTS 130. This is where the synchronization of the SCDMA communication systems is extremely important. When a number of the CMs all transmit their signals at a same time such that these signals are received at the CMTS 130 on the same frequency and at the same time, they must all be able to be properly de-spread and decoded for proper signal processing.

Each of the CMs users 111, 115, ..., 121 is located a respective transmit distance from the CMTS 130. In order to achieve optimum spreading diversity and orthogonality for the CMs users 111, 115, ..., 121 to transmission of the CMTS 130, each of the CM transmissions must be synchronized so that it arrives, from the perspective of the CMTS 130, synchronous with other CM transmissions. In order to achieve this goal, for a particular transmission cycle, each of the CMs 111, 115, ..., 121 will typically transmit to the CMTS 130 at a respective transmission time, which will likely differ from the transmission times of other CMs. These differing transmission times will be based upon the relative transmission distance between the CM and the CMTS 130. These operations may be supported by the determination of the round trip delays (RTPs) between the CMTS 130 and each supported CM. With these RTPs determined, the CMs may then determine at what point to transmit their SCDMA data so that all CM transmissions will arrive synchronously at the CMTS 130.

The present invention enables estimation of CFO between each of the CM users (CMs users 111, 115, ..., 121) within the CMTS 130. All of the functionality described herein this patent application may be performed within the context of the CM communication system of the FIG. 1. The FIG. 1 shows just one embodiment where the various aspects of the present invention may be implemented. Several other embodiments are described as well.

Figure 2:
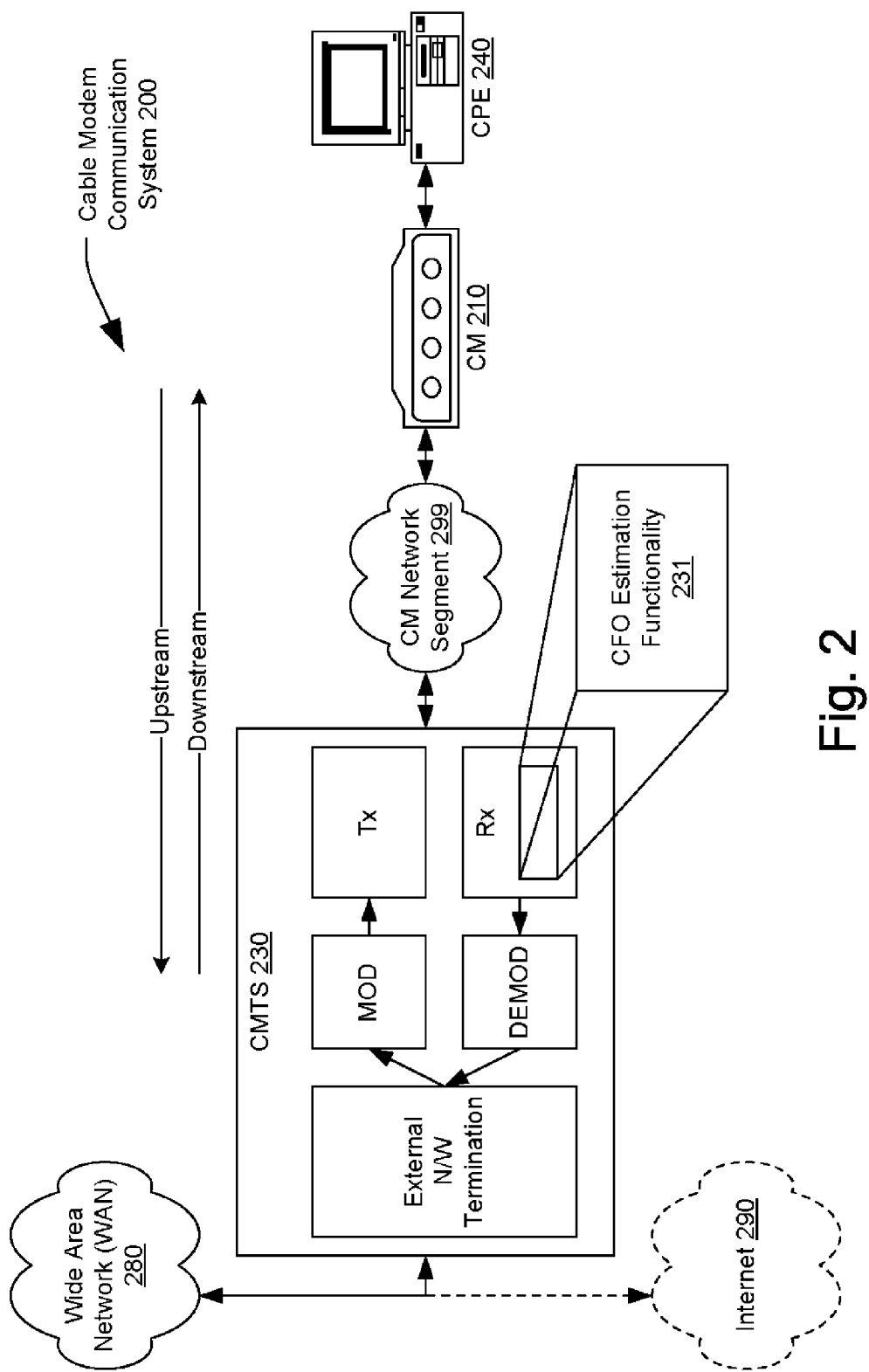
FIG. 2 is a system diagram illustrating another embodiment of a CM communication system that is built according to the present invention.

FIG. 2 is a system diagram illustrating another embodiment of a CM communication system 200 that is built according to the present invention. From certain perspectives, the FIG. 2 may be viewed as a communication system allowing bi-directional communication between a customer premise equipment (CPE) 240 and a network. In some embodiments, the CPE 240 is a personal computer or some other device allowing a user to access an external network. The network may be a wide area network (WAN) 280, or alternatively, the Internet 290 itself. For example, the CM communication system 200 is operable to allow Internet protocol (IP) traffic to achieve transparent bi-directional transfer between a CMTS-network side interface (CMTS-NSI: viewed as being between the CMTS 230 and the Internet 290) and a CM to CPE interface (CMCI: viewed as being between the CM 210 and the CPE 240).

The WAN 280, and/or the Internet 290, is/are communicatively coupled to the CMTS 230 via a CMTS-NSI. The CMTS 230 is operable to support the external network termination, for one or both of the WAN 280 and the Internet 290. The CMTS 230 includes a modulator and a demodulator to support transmitter and receiver functionality to and from a CM network segment 299. The receiver functionality within the CMTS 230 is operable to support CFO estimation functionality 231 according to the present invention.

A number of elements may be included within the CM network segment 299, as understood by those persons having skill in the art. For example, routers, splitters, couplers, relays, and amplifiers may be contained within the CM network segment 299 without departing from the scope and spirit of the invention. The CM network segment 299 allows communicative coupling between a CM user and the CMTS 230.

FIG. 3A is a system diagram illustrating an embodiment of a cellular communication system 300A that is built according to the present invention. A mobile transmitter 310 has a local antenna 311. The mobile transmitter 310 may be any number of types of transmitters including a cellular telephone, a wireless pager unit, a mobile computer having transmit functionality, or any other type of mobile transmitter. The mobile transmitter 310 transmits a signal, using its local antenna 311, to a base station receiver 340 via a wireless communication channel. The base station receiver 340 is communicatively coupled to a receiving wireless tower 349 to be able to receive transmission from the local antenna 311 of the mobile transmitter 310 that have been communicated via the wireless communication channel. The receiving wireless tower 349 communicatively couples the received signal to the base station receiver 340.

The base station receiver 340 is then able to support CFO estimation functionality according to the present invention, as shown in a functional block 341, on the received signal. The FIG. 3A shows just one of many embodiments where the CFO estimation, performed according to the present invention, may be performed to provide for improved operation within a communication system.

FIG. 3B is a system diagram illustrating another embodiment of a cellular communication system that is built according to the present invention. From certain perspectives, the FIG. 3B may be viewed as being the reverse transmission operation of the cellular communication system 300B of the FIG. 3A. A base station transmitter 320 is communicatively coupled to a transmitting wireless tower 321. The base station transmitter 320, using its transmitting wireless tower 321, transmits a signal to a local antenna 339 via a wireless communication channel. The local antenna 339 is communicatively coupled to a mobile receiver 330 so that the mobile receiver 330 is able to receive transmission from the transmitting wireless tower 321 of the base station transmitter 320 that have been communicated via the wireless communication channel. The local antenna 339 communicatively couples the received signal to the mobile receiver 330. It is noted that the mobile receiver 330 may be any number of types of transmitters including a cellular telephone, a wireless pager unit, a mobile computer having transmit functionality, or any other type of mobile transmitter.

The base station receiver 340 is then able to support CFO estimation functionality according to the present invention, as shown in a functional block 331, on the received signal. The FIG. 3B shows just one of many embodiments where the CFO estimation functionality, performed according to the present invention, may be performed to provide for improved operation within a communication system.

Figure 4:
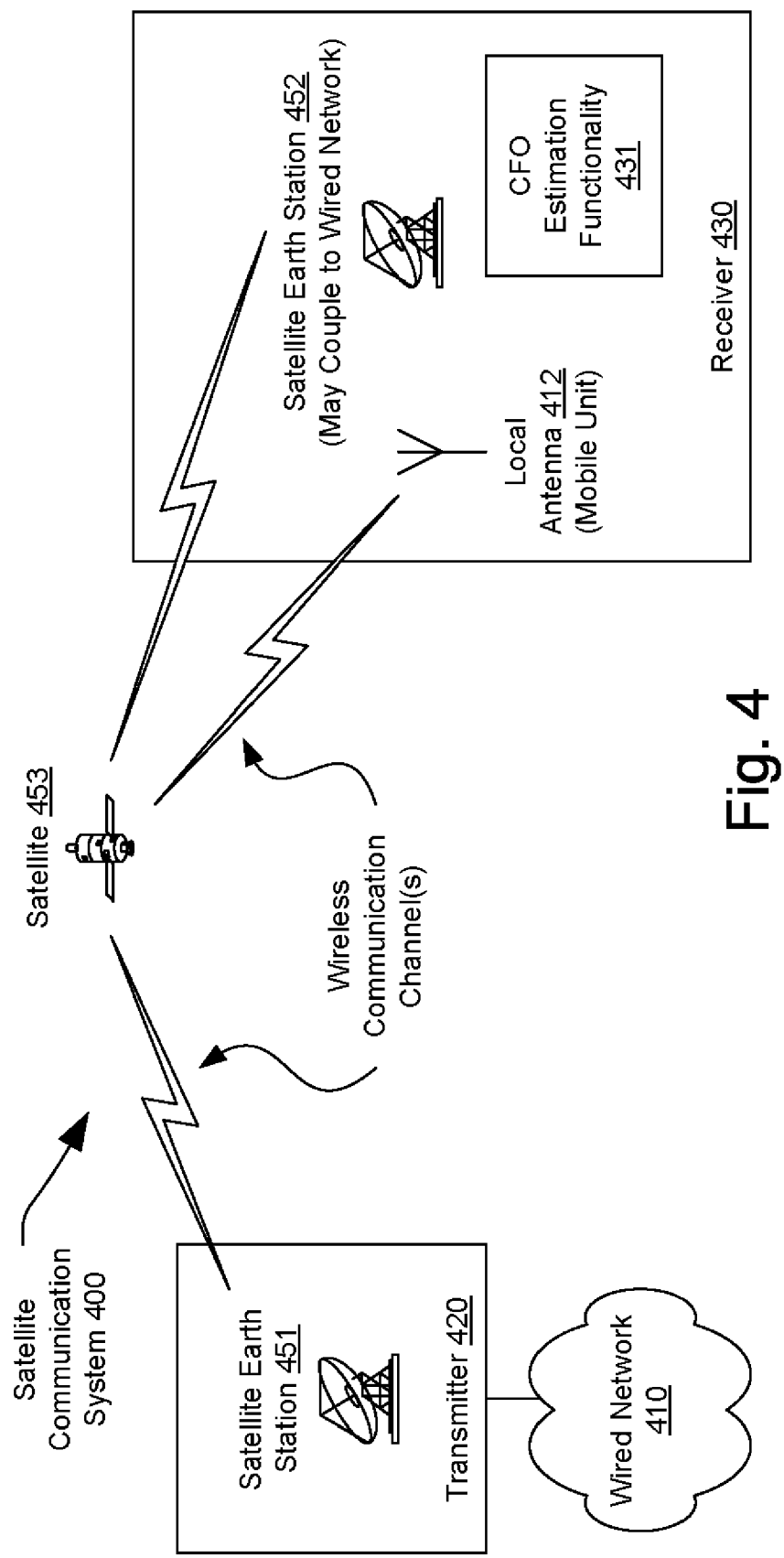
FIG. 4 is a system diagram illustrating an embodiment of a satellite communication system that is built according to the present invention.

FIG. 4 is a system diagram illustrating an embodiment of a satellite communication system 400 that is built according to the present invention. A transmitter 420 is communicatively coupled to a wired network 410. The wired network 410 may include any number of networks including the Internet, proprietary networks, and other wired networks as understood by those persons having skill in the art. The transmitter 420 includes a satellite earth station 451 that is able to communicate to a satellite 453 via a wireless communication channel. The satellite 453 is able to communicate with a receiver 430. The receiver 430 is also located on the earth. Here, the communication to and from the satellite 453 may cooperatively be viewed as being a wireless communication channel, or each of the communication to and from the satellite 453 may be viewed as being two distinct wireless communication channels.

For example, the wireless communication "channel" may be viewed as not including multiple wireless hops in one embodiment. In other embodiments, the satellite 453 receives a signal received from the satellite earth station 451, amplifies it, and relays it to the receiver 430; the receiver 430 may include terrestrial receivers such as satellite receivers, satellite based telephones, and satellite based Internet receivers, among other receiver types. In the case where the satellite 453 receives a signal received from the satellite earth station 451, amplifies it, and relays it, the satellite 453 may be viewed as being a "transponder." In addition, other satellites may exist that perform both receiver and transmitter operations. In this case, each leg of an up-down transmission via the wireless communication channel would be considered separately. The wireless communication channel between the satellite 453 and a fixed earth station would likely be less time-varying than the wireless communication channel between the satellite 453 and a mobile station.

In whichever embodiment, the satellite 453 communicates with the receiver 430. The receiver 430 may be viewed as being a mobile unit in certain embodiments (employing a local antenna 412); alternatively, the receiver 430 may be viewed as being a satellite earth station 452 that may be communicatively coupled to a wired network in a similar manner that the satellite earth station 451, within the transmitter 420, communicatively couples to a wired network. In both situations, the receiver 430 is able to support CFO estimation functionality, as shown in a functional block 431, according to the present invention. For example, the receiver 430 is able to perform CFO estimation, as shown in a functional block 431, on the signal received from the satellite 453. The FIG. 4 shows just one of many embodiments where the CFO estimation, performed according to the present invention, may be performed to provide for improved receiver performance.

FIG. 5A is a system diagram illustrating an embodiment of a microwave communication system 500A that is built according to the present invention. A tower transmitter 511 includes a wireless tower 515. The tower transmitter 511, using its wireless tower 515, transmits a signal to a tower receiver 512 via a wireless communication channel. The tower receiver 512 includes a wireless tower 516. The wireless tower 516 is able to receive transmissions from the wireless tower 515 that have been communicated via the wireless communication channel. The tower receiver 512 is then able to support CFO estimation functionality, as shown in a functional block 533. The FIG. 5A shows just one of many embodiments where CFO estimation, performed according to the present invention, may be performed to provide for improved receiver performance.

FIG. 5B is a system diagram illustrating an embodiment of a point-to-point radio communication system 500B that is built according to the present invention. A mobile unit 551 includes a local antenna 555. The mobile unit 551, using its local antenna 555, transmits a signal to a local antenna 556 via a wireless communication channel. The local antenna 556 is included within a mobile unit 552. The mobile unit 552 is able to receive transmissions from the mobile unit 551 that have been communicated via the wireless communication channel. The mobile unit 552 is then able to support CFO estimation functionality, as shown in a functional block 553, on the received signal. The FIG. 5B shows just one of many embodiments where CFO estimation, performed according to the present invention, may be performed to provide for improved receiver performance.

Figure 6:
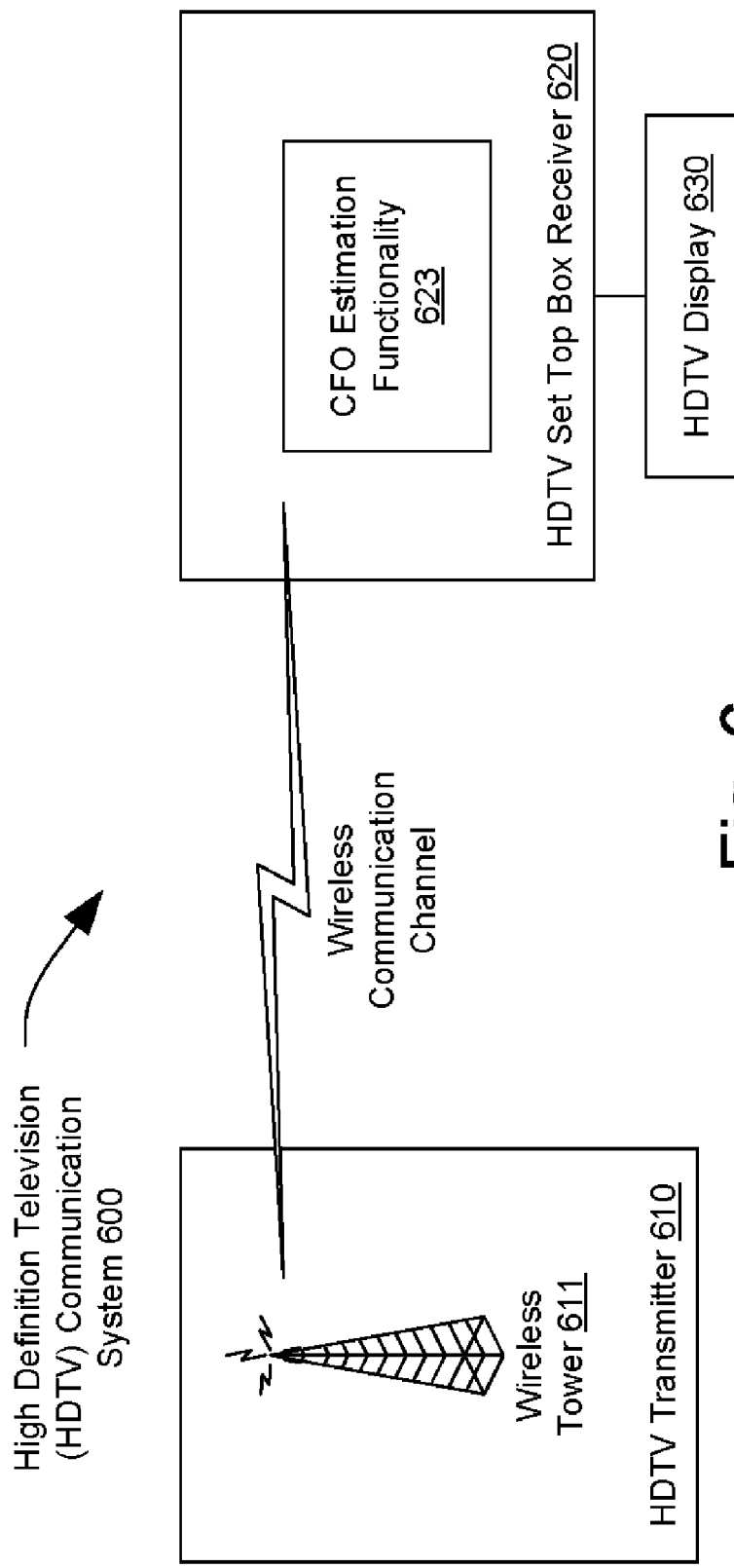
FIG. 6 is a system diagram illustrating an embodiment of a high definition (HDTV) communication system that is built according to the present invention.

FIG. 6 is a system diagram illustrating an embodiment of a high definition (HDTV) communication system 600 that is built according to the present invention. An HDTV transmitter 610 includes a wireless tower 611. The HDTV transmitter 610, using its wireless tower 611, transmits a signal to an HDTV set top box receiver 620 via a wireless communication channel. The HDTV set top box receiver 620 includes the functionality to receive the wireless transmitted signal. The HDTV set top box receiver 620 is also communicatively coupled to an HDTV display 630 that is able to display the demodulated and decoded wireless transmitted signals received by the HDTV set top box receiver 620.

The HDTV set top box receiver 620 is then able to support CFO estimation functionality, as shown in a functional block 623 to provide for improved receiver performance. The FIG. 6 shows yet another of many embodiments where CFO estimation, performed according to the present invention, may be performed to provide for improved receiver performance.

Figure 7:
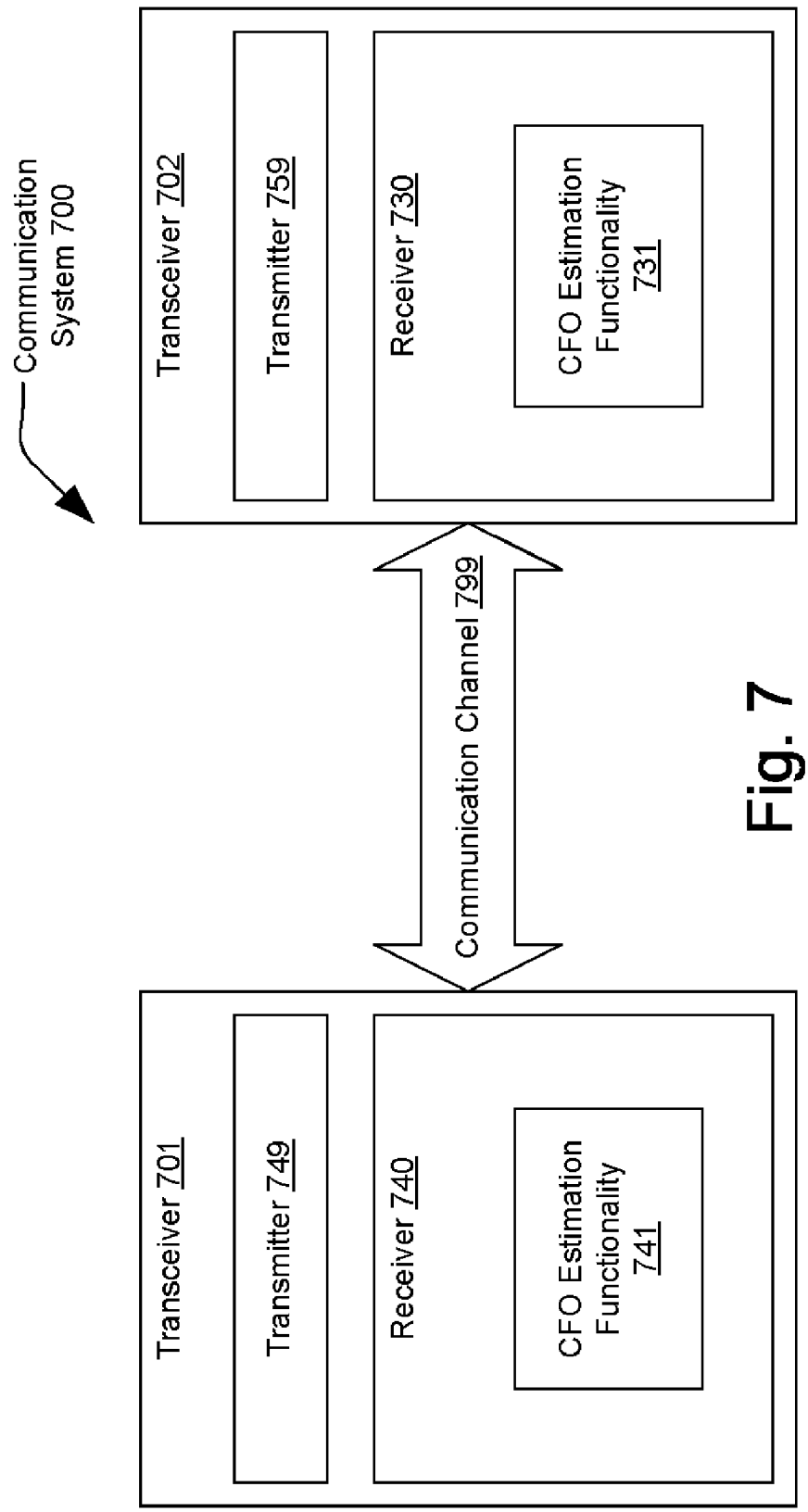
FIG. 7 is a system diagram illustrating an embodiment of a communication system that is built according to the present invention.

FIG. 7 is a system diagram illustrating an embodiment of a communication system that is built according to the present invention. The FIG. 7 shows communicative coupling, via a communication channel 799, between two transceivers, namely, a transceiver 701 and a transceiver 702. The communication channel 799 may be a wireline communication channel or a wireless communication channel.

Each of the transceivers 701 and 702 includes a transmitter and a receiver. For example, the transceiver 701 includes a transmitter 749 and a receiver 740; the transceiver 702 includes a transmitter 759 and a receiver 730. The receivers 740 and 730, within the transceivers 701 and 702, respectively, are each operable to support CFO estimation functionality according to the present invention. This will allow improved signal processing for both of the transceivers 701 and 702. For example, the receiver 740, within the transceiver 701, is able to support CFO estimation functionality, as shown in a functional block 741, on a signal received from the transmitter 759 of the transceiver 702. Similarly, the receiver 730, within the transceiver 702, is able to support CFO estimation functionality, as shown in a functional block 731, on a signal received from the transmitter 749 of the transceiver 701. The FIG. 7 shows yet another of many embodiments where CFO estimation, performed according to the present invention, may be performed to provide for improved performance.

Figure 8:
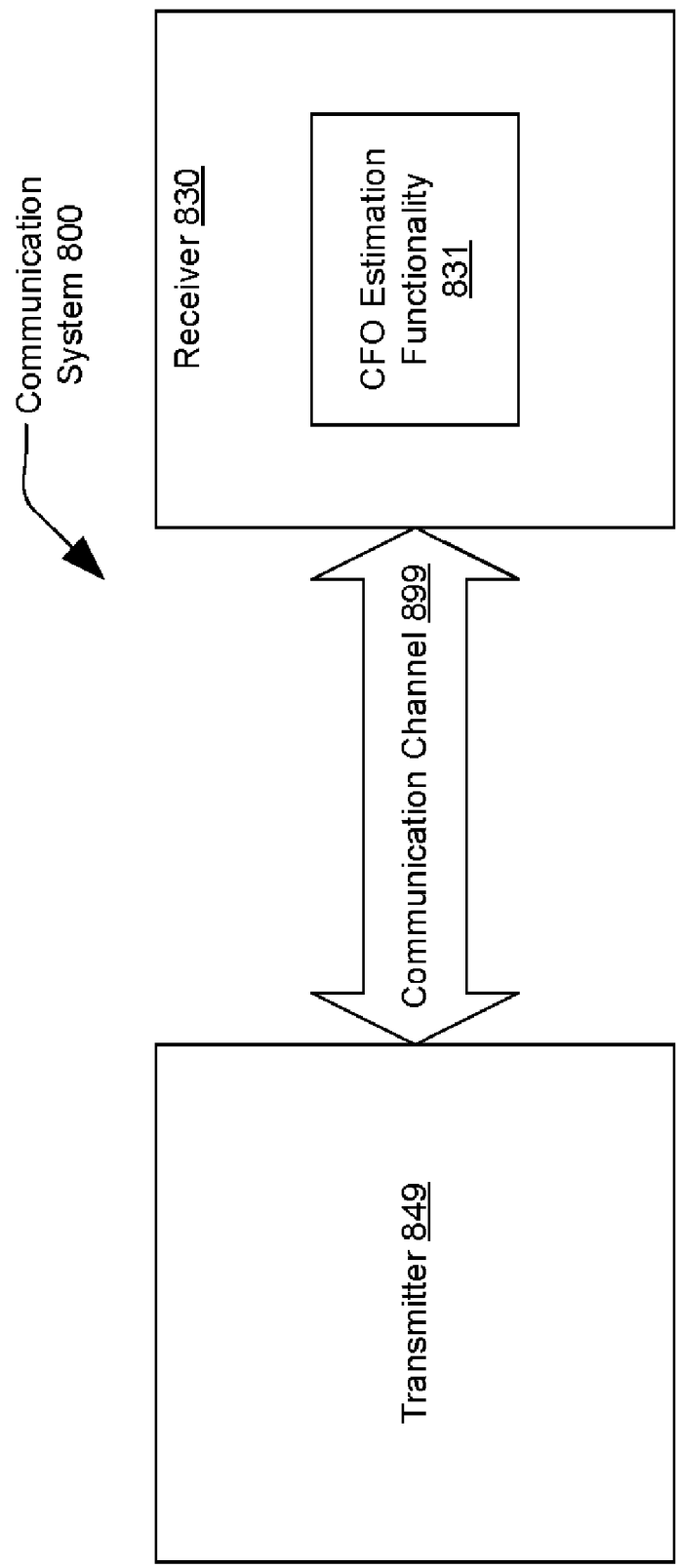
FIG. 8 is a system diagram illustrating another embodiment of a communication system that is built according to the present invention.

FIG. 8 is a system diagram illustrating another embodiment of a communication system 800 that is built according to the present invention. The FIG. 8 shows communicative coupling, via a communication channel 899, between a transmitter 849 and a receiver 830. The communication channel 899 may be a wireline communication channel or a wireless communication channel. The receiver 830 is operable to support CFO estimation, as shown in a functional block 831, according to the present invention. The FIG. 8 shows yet another of many embodiments where CFO estimation, performed according to the present invention, may be performed to provide for improved performance.

Figure 9:
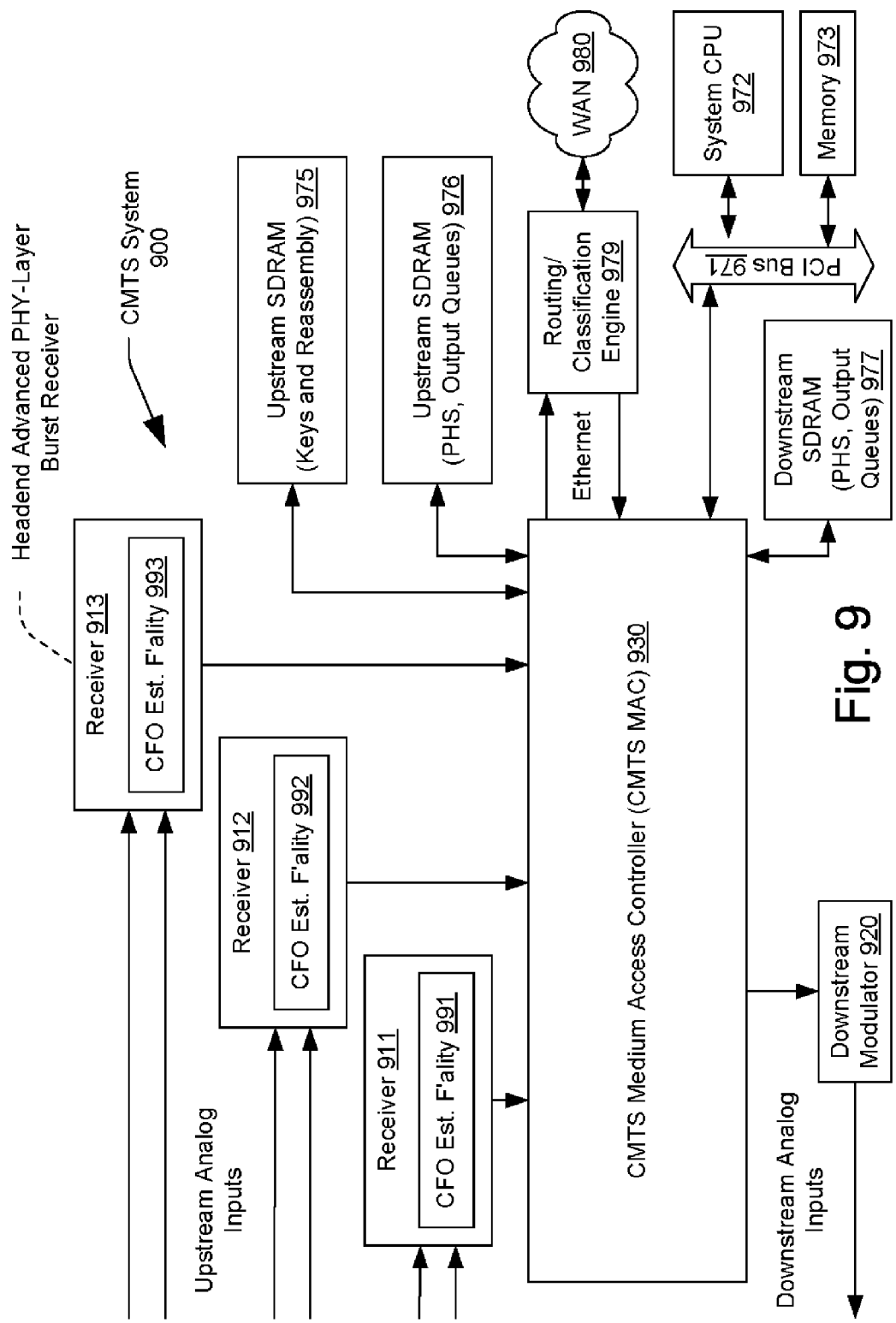
FIG. 9 is a system diagram illustrating an embodiment of a cable modem termination system (CMTS) system that is built according to the present invention.

FIG. 9 is a system diagram illustrating an embodiment of a CMTS system 900 that is built according to the present invention. The CMTS system 900 includes a CMTS medium access controller (MAC) 930 that operates with a number of other devices to perform communication from one or more CMs to a WAN 980. The CMTS MAC 930 may be viewed as providing the hardware support for MAC-layer per-packet functions including fragmentation, concatenation, and payload header suppression that all are able to offload the processing required by a system central processing unit (CPU) 972. This will provide for higher overall system performance. In addition, the CMTS MAC 930 is able to provide support for carrier class redundancy via timestamp synchronization across a number of receivers, shown as a receiver 911, a receiver 911, and a receiver 913 that are each operable to receive upstream analog inputs. In certain embodiments, each of the receivers 911, 912, and 913 are dual universal advanced TDMA/CDMA (Time Division Multiple Access/Code Division Multiple Access) PHY-layer burst receivers. That is top say, each of the receivers 911, 912, and 913 includes at least one TDMA receive channel and at least one CDMA receive channel; in tic case, each of the receivers 911, 912, and 913 may be viewed as being multi-channel receivers.

In addition, the CMTS MAC 930 may be operated remotely with a routing/classification engine 979 that is located externally to the CMTS MAC 930 for distributed CMTS applications including mini fiber node applications. Moreover, a Standard Programming Interface (SPI) master port may be employed to control the interface to the receivers 911, 912, and 913 as well as to a downstream modulator 920.

The CMTS MAC 930 may be viewed as being a highly integrated CMTS MAC integrated circuit (IC) for use within the various DOCSIS and advanced TDMA CDMA physical layer (PHY-layer) CMTS products. The CMTS MAC 930 employs sophisticated hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM 975 (operable to support keys and reassembly) and SDRAM 976 (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC 930 includes an out-of-band generator and TDMA PHY-layer (and/or CDMA PHY-layer) interface so that it may communicate with a CM device's out-of-band receiver for control of power management functions. The downstream processor will also use SDRAM 977 (operable to support PHS and output queues). The CMTS MAC 930 may be configured and managed externally via a PCI interface and a PCI bus 971.

Each of the receivers 911, 912, and 913 is operable to support CFO estimation functionality. For example, the receiver 911 is operable to support CFO estimation functionality, as shown in a functional block 991; the receiver 912 is operable to support CFO estimation functionality, as shown in a functional block 992; and the receiver 913 is operable to support CFO estimation functionality, as shown in a functional block 993. The FIG. 9 shows yet another embodiment in which CFO estimation may be performed according to the present invention. Any of the functionality and operations described in the other embodiments may be performed within the context of the CMTS system 900 without departing from the scope and spirit of the invention.

Figure 10:
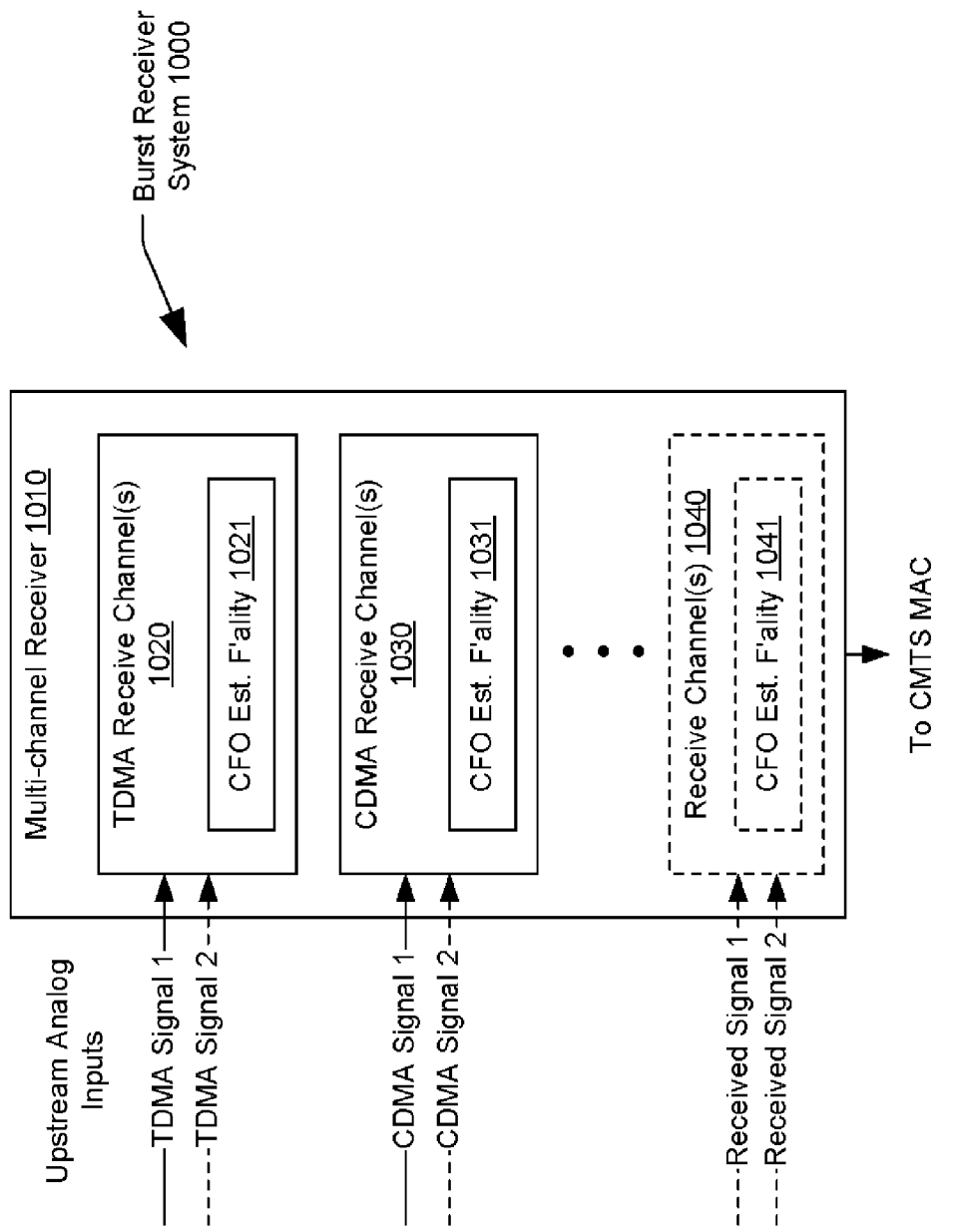
FIG. 10 is a system diagram illustrating an embodiment of a burst receiver system that is built according to the present invention.

FIG. 10 is a system diagram illustrating an embodiment of a burst receiver system 1000 that is built according to the present invention. The burst receiver system 1000 includes at least one multi-channel receiver 1010. The multi-channel receiver 1010 is operable to receive a number of upstream analog inputs that are transmitted from CMs. The upstream analog inputs may be in the form of either TDMA (Time Division Multiple Access) and/or CDMA (Code Division Multiple Access) format. A number of receive channels may be included within the multi-channel receiver 1010.

For example, the multi-channel receiver 1010 is operable to support a number of TDMA receive channels 1020 (shown as TDMA signal 1 and TDMA signal 2) and to support CFO estimation functionality, as shown in a functional block 1021, for those received TDMA signals. The multi-channel receiver 1010 is operable to support a number of TDMA receive channels 1030 (shown as CDMA signal 1 and CDMA signal 2) and to support CFO estimation functionality, as shown in a functional block 1031, for those received CDMA signals. Generically speaking, the multi-channel receiver 1010 is operable to support a number of receive channels 1040 (shown as received signal 1 and received signal 2) and to support CFO estimation functionality, as shown in a functional block 1041, for those received signals. The multi-channel receiver 1010 of the FIG. 10 is operable to interface with a CMTS MAC. Those persons having skill in the art will appreciate that the burst receiver system 1000 may include a number of multi-channel receivers that are each operable to interface with the CMTS MAC.

In certain embodiments, the multi-channel receiver 1010 proffers a number of various functionalities. The multi-channel receiver 1010 may be a universal headend advanced TDMA PHY-layer QPSK/QAM (Quadrature Phase Shift Keying/Quadrature Amplitude Modulation) burst receiver; the multi-channel receiver 1010 also includes functionality to be a universal headend advanced CDMA PHY-layer QPSK/QAM burst receiver; or the multi-channel receiver 1010 also include functionality to be a universal headend advanced TDMA CDMA PHY-layer QPSK/QAM burst receiver offering both TDMA/CDMA functionality. The multi-channel receiver 1010 may be DOCSIS/EuroDOCSIS based, IEEE 802.14 compliant. The multi-channel receiver 1010 may be adaptable to numerous programmable demodulation including BPSK (Binary Phase Shift Keying), and/or QPSK, 8/16/32/64/128/256/516/1024 QAM. The multi-channel receiver 1010 is adaptable to support variable symbols rates as well. Other functionality may likewise be included to the multi-channel receiver 1010 without departing from the scope and spirit of the invention. Those persons having skill in the art will recognize that such variations and modifications may be made to the communication receiver.

Figure 11:
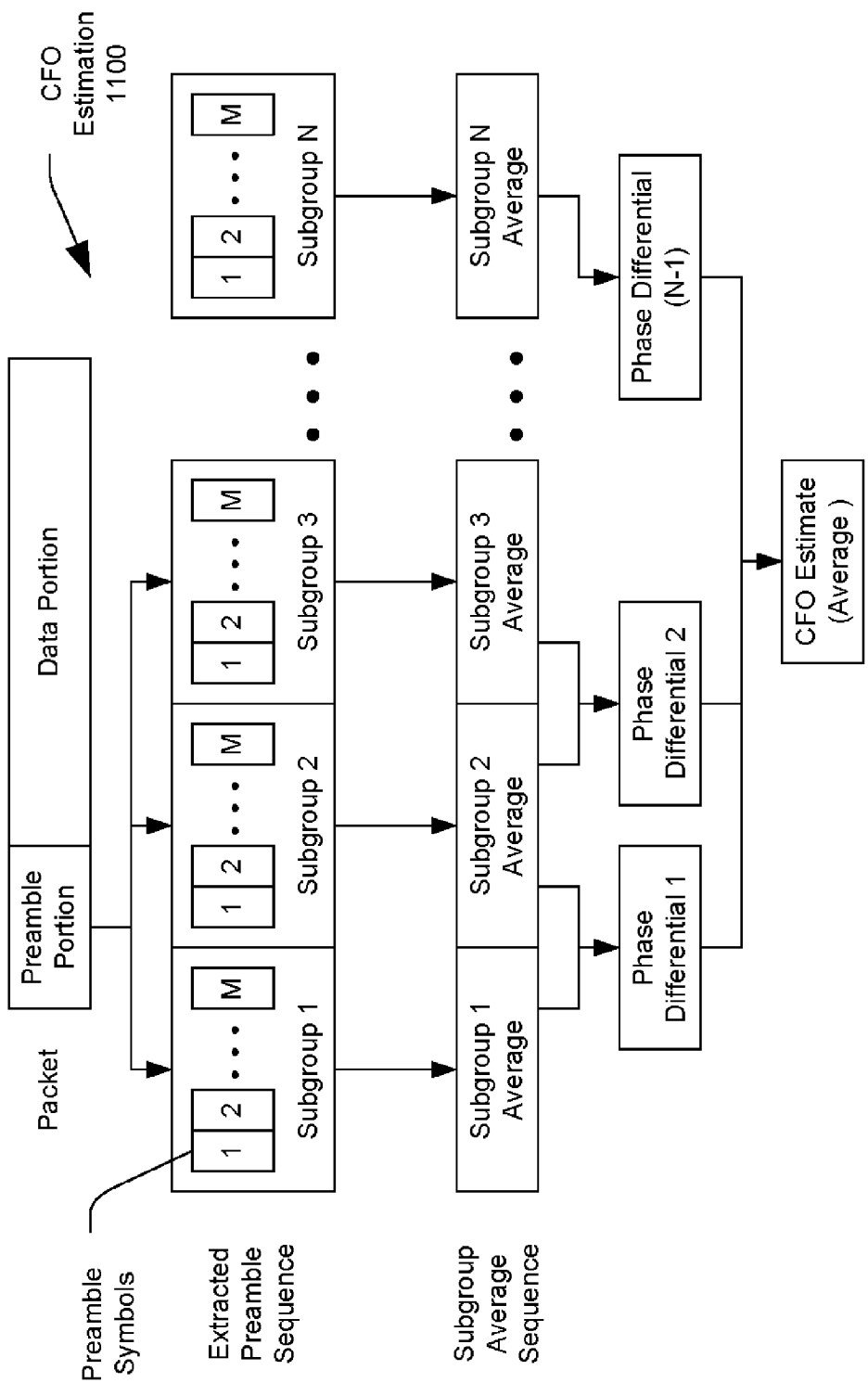
FIG. 11 is a diagram illustrating an embodiment of CFO estimation that is performed according to the present invention.

FIG. 11 is a diagram illustrating an embodiment of CFO estimation 1100 that is performed according to the present invention. A packet includes a preamble and a data portion. The preamble portion is extracted, and the extracted preamble sequence is partitioned into a number of subgroups, shown as a subgroup 1 . . . N. Each of the subgroups includes a number of preamble symbols, shown as 1 . . . M. The number of preamble symbols M may be substantially optimized for the number of subgroups N; alternatively, the number of preamble symbols M may be predetermined and fixed irrespective of the number of subgroups N. A subgroup average is calculated for each of the averages. Here, a subgroup average sequence is then generated that is composed of the averages for the subgroups 1 . . . N; this is shown as a subgroup average 1, a subgroup average 2, . . . , a subgroup average N. Phase differentials are then determined between each of the subgroup averages 1 . . . N, shown as a phase differential 1, phase differential 2, . . . , phase differential N−1. A CFO estimate is then determined by employing averaging each of the phase differentials. The FIG. 11 shows yet another embodiment where CFO estimation may be performed according to the present invention.

Figure 12:
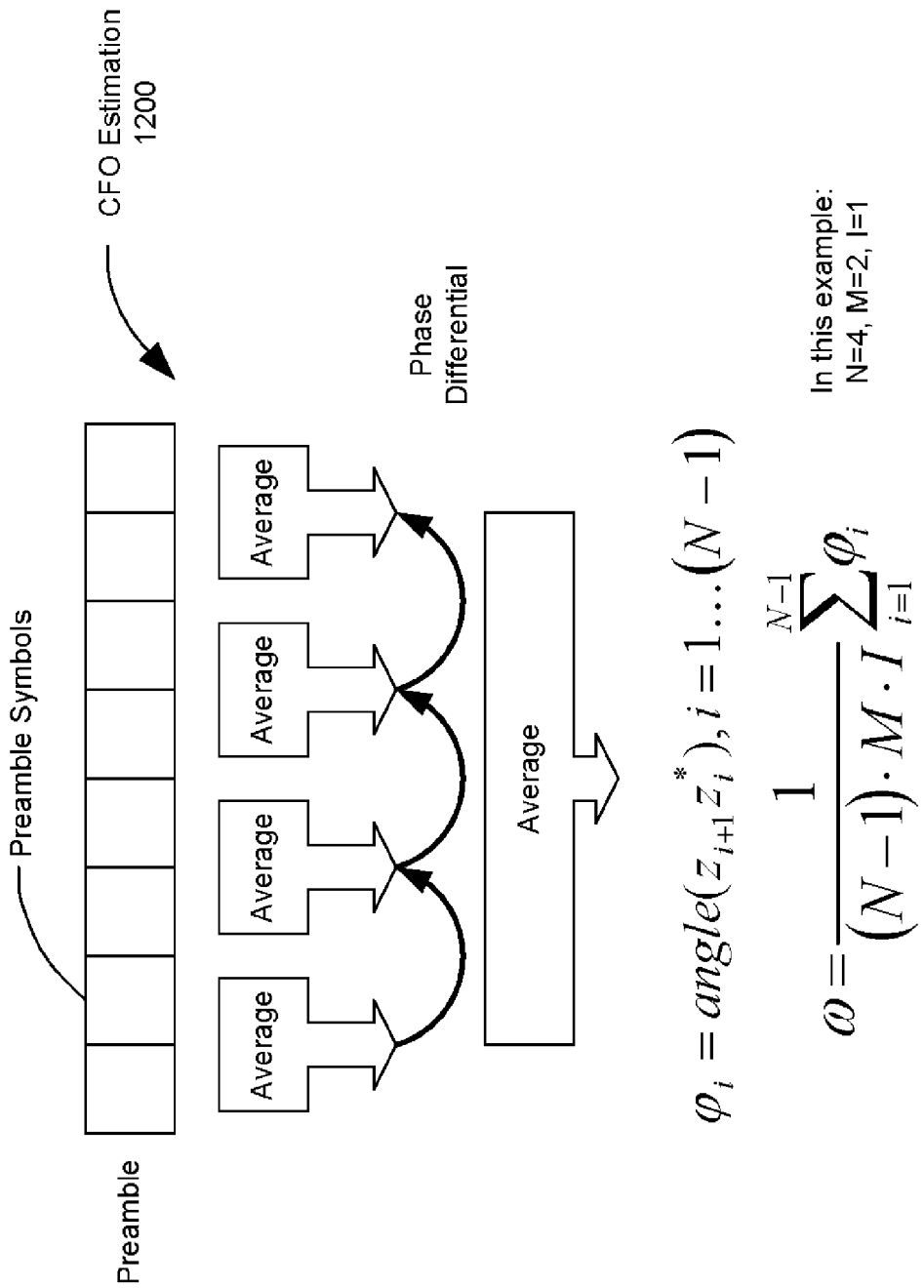
FIG. 12 is a diagram illustrating another embodiment of CFO estimation that is performed according to the present invention.

FIG. 12 is a diagram illustrating another embodiment of CFO estimation 1200 that is performed according to the present invention. A preamble is received that may be viewed as being a received sequence having elements $\{x_1, x_2, \ldots, x_L\}$ where L is the preamble length. This received "preamble" is then divided into a number of groups each having a particular size. The angular frequency offset estimate $\omega$ is computed as follows:

The preamble symbols are first removed from the preamble to get the sequence $\{y_i = x_i/p_i\}$, where $\{p_i\}$ is the expected, preamble sequence before any modification during transmission. This new sequence $\{y_i\}$ may be viewed as being an intermediate preamble sequence. This new sequence $\{y_i\}$ is then divided into N subgroups, with M symbols in each subgroup, such that N=L/M. Each subgroup is averaged to get a sequence $\{z_i\}$ of N elements.

The phase differential between $z_i$ and $z_{i+1}$ is obtained, to get N−1 phase differentials and then the angular frequency offset $\omega$ $$\varphi_i = \text{angle}(z_{i+1} z_i^*), i = 1 \cdots N-1$$

$$\omega = \frac{1}{(N-1) \cdot M \cdot I} \sum_{i=1}^{N-1} \varphi_i$$

where I is the interleaving depth. In the FIG. 12, the number of subgroups N=4, the number of symbols in each subgroup M=2, and the interleaving depth I=1. The value of M may be optimized for various values of N; alternatively, the value of M may be predetermined and fixed irrespective of the value of N. In addition, the value of N may be optimized for each given value of L; alternatively, the value of N may be fixed irrespective of the value of L.

Figure 13:
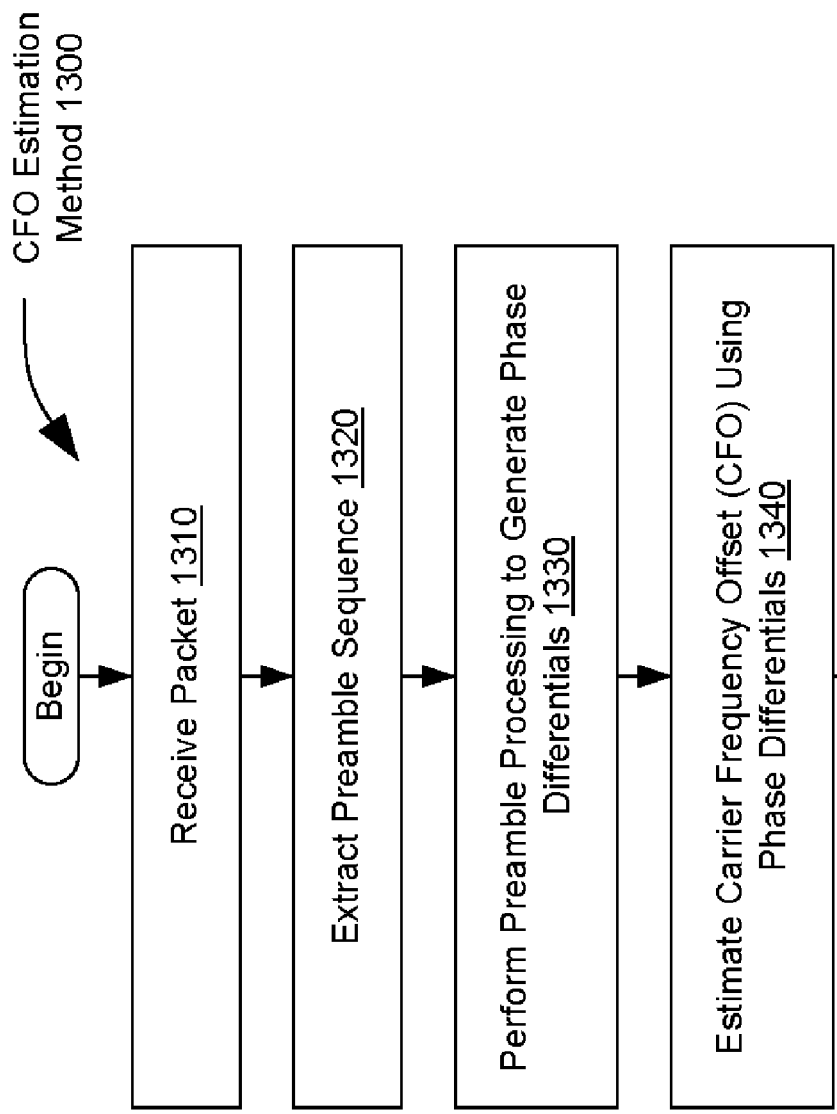
FIG. 13 is a flow diagram illustrating an embodiment of a CFO estimation method that is performed according to the present invention.

FIG. 13 is a flow diagram illustrating an embodiment of a CFO estimation method 1300 that is performed according to the present invention. In a block 1310, a packet is received. A preamble sequence is extracted from the received packet as shown in a block 1320. Then, preamble processing is performed on the preamble sequence of the received packet to generate phase differentials. Using the phase differentials generated in the block 1330, CFO estimation is performed in a block 1340. The FIG. 13 shows one manner in which CFO estimation may be performed according to the present invention.

Figure 14:
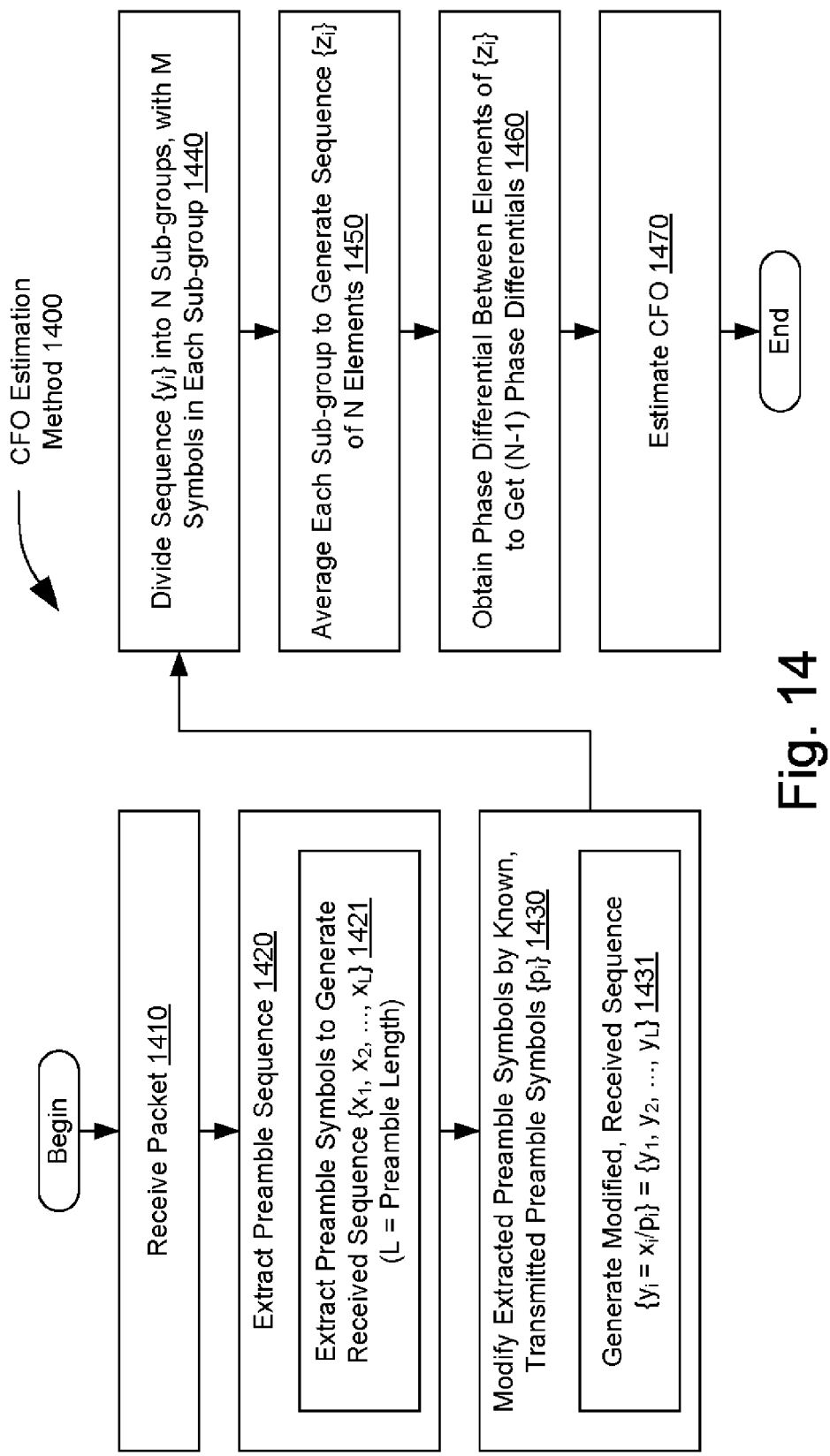
FIG. 14 is a flow diagram illustrating another embodiment of a CFO estimation method that is performed according to the present invention.

FIG. 14 is a flow diagram illustrating another embodiment of a CFO estimation method 1400 that is performed according to the present invention. In a block 1410, a packet is received. In a block 1420, a preamble sequence is extracted from the received packet. This received "preamble" is then divided into a number of groups each having a particular size. The extracted, received preamble sequence may be viewed as being a received sequence having elements $\{x_1, x_2, \ldots, x_L\}$, where L is the preamble length, as shown in a block 1421. In a block 1430, the extracted, received preamble sequence is then modified by the known, transmitted preamble symbols $\{p_i\}$. The preamble symbols are first removed from the preamble to get the sequence $\{y_i = x_i/p_i\}$, where $\{p_i\}$ is the expected, preamble sequence before any modification during transmission; this operation is shown in a block 1431. A new sequence $\{y_i\}$ is then generated having elements $\{y_1, y_2, \ldots, y_L\}$.

This new sequence $\{y_i\}$ is then divided into N subgroups, with M symbols in each subgroup, such that N=L/M; this operation is shown in a block 1440. Each subgroup is then averaged to get a sequence $\{z_i\}$ of N elements as shown in a block 1450.

The phase differential between $z_i$ and $z_{i+1}$ is obtained, to get N−1 phase differentials, as shown in a block 1460. Then, in a block 1470, the CFO, shown as angular frequency offset $\omega$, is estimated as follows:

$$\varphi_i = \text{angle}(z_{i+1} z_i^*), \ i = 1 \cdots N-1$$

$$\omega = \frac{1}{(N-1) \cdot M \cdot I} \sum_{i=1}^{N-1} \varphi_i$$

where I is the interleaving depth. Similar to other embodiments described above, the value of M may be optimized for various values of N; alternatively, the value of M may be predetermined and fixed irrespective of the value of N. The FIG. 14 shows yet another manner in which CFO estimation may be performed according to the present invention.

The present invention provides for CFO estimation in a manner that provides a better, more efficient performance compared to two other CFO estimation methods (KAY and Fitz) as well as that provided by the Cramer Rao Bound. The KAY and Fitz CFO estimation methods are described in the following article: Umberto Mengali and M. Morelli. "Data-Aided Frequency Estimation for Burst Digital Transmission," *IEEE Transactions on Communications,* vol. 45, no. 1, pp. 23-25, January 1997. CFO estimation, according to the present invention, has a higher accuracy than the Fitz method. It can also be shown that it has a much lower complexity as well as a higher accuracy than the KAY method at low SNR. The present invention provides a relatively higher accuracy and/or lower complexity than known carrier frequency estimation methods. The present invention also provides for a high degree of flexibility in compromising performance and complexity.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. A communication device, comprising:
    an input that is operative to receive a signal from a communication channel from which a preamble portion and a data portion are extracted; and
    a carrier frequency offset module that is operative to:
        partition the preamble portion into a plurality of sub-groups;
        calculate a plurality of sub-group carrier frequency offsets such that each sub-group carrier frequency offset of the plurality of sub-group carrier frequency offsets corresponds to one sub-group of the plurality of sub-groups;
        calculate a plurality of phase differentials such that each phase differential of the plurality of phase differentials is calculated using two adjacent sub-group carrier frequency offset within the plurality of sub-group carrier frequency offsets; and
        calculate a carrier frequency offset of the received signal using the plurality of phase differentials.

2. The communication device of claim 1, wherein:
    a sub-group carrier frequency offset of the plurality of sub-group carrier frequency offsets is an average carrier frequency offset calculated using preamble symbols within one corresponding sub-group of the plurality of sub-groups.

3. The communication device of claim 1, wherein:
    the carrier frequency offset module is operative to modify the preamble portion using an expected preamble portion before partitioning the now-modified preamble portion into the plurality of sub-groups.

4. The communication device of claim 1, wherein:
    the communication device is a multi-channel communication device that is operative to receive a plurality of signals transmitted via a plurality of communication channels.

5. The communication device of claim 1, wherein:
    the communication device is a multi-channel communication device that is operative to receive a plurality of time division multiple access (TDMA) signals transmitted via a plurality of communication channels.

6. The communication device of claim 1, wherein:
    the communication device is a multi-channel communication device that is operative to receive a plurality of code division multiple access (CDMA) signals transmitted via a plurality of communication channels.

7. The communication device of claim 1, wherein:
    the received signal has an interleaving depth; and the carrier frequency offset module is operative to calculate the carrier frequency offset of the received signal using the plurality of phase differentials and the interleaving depth.

8. The communication device of claim 1, wherein:
    the communication device is a burst receiver.

9. The communication device of claim 1, wherein:
the communication device is a burst receiver; and the burst receiver is operative to receive and demodulate a first signal using a first modulation selected from Binary Phase Shift Keying (BPSK), Quadrature Phase Shift Keying (QPSK), 8 Quadrature Amplitude Modulation (QAM), 16 QAM, 32 QAM, 64 QAM, 128 QAM, 256 QAM, 516 QAM, and 1024 QAM; and the burst receiver is operative to receive and demodulate a second signal using a second modulation selected from BPSK, QPSK, 8 QAM, 16 QAM, 32 QAM, 64 QAM, 128 QAM, 256 QAM, 516 QAM, and 1024 QAM.

10. The communication device of claim 1, wherein:
the communication device is a burst receiver; and
the burst receiver is Data Over Cable Service Interface Specifications (DOCSIS) protocol compliant.

11. A communication device, comprising:
a receive channel that is operative to receive a signal from which a preamble portion, that includes a plurality of preamble symbols, is extracted; and
a carrier frequency offset module that is operable to:
partition the plurality of preamble symbols into a first sub-group having first plurality of preamble symbols, a second sub-group having a second plurality of preamble symbols, and a third sub-group having a third plurality of preamble symbols;
calculate a first sub-group carrier frequency offset average using the first plurality of preamble symbols;
calculate a second sub-group carrier frequency offset average using the second plurality of preamble symbols;
calculate a third sub-group carrier frequency offset average using the third plurality of preamble symbols;
calculate a first phase differential using the first sub-group carrier frequency offset average and the second sub-group carrier frequency offset average;
calculate a second phase differential using the second sub-group carrier frequency offset average and the third sub-group carrier frequency offset average; and
calculate a carrier frequency offset of the received signal using the first phase differential and the second phase differential.

12. The communication device of claim 11; wherein:
the carrier frequency offset module is operative to modify the plurality of preamble symbols using an expected plurality of preamble symbols before partitioning the now-modified plurality of preamble symbols into the first sub-group, the second sub-group, and the third sub-group.

13. The communication device of claim 11, wherein:
the communication device is a multi-channel communication device that is operative to receive a plurality of signals transmitted via a plurality of communication channels.

14. The communication device of claim 11, wherein:
the communication device is a burst receiver.

15. The communication device of claim 11, wherein:
the communication device is a burst receiver; and
the burst receiver is Data Over Cable Service Interface Specifications (DOCSIS) protocol compliant.

16. A method, comprising:
receiving a signal from a communication channel;
extracting a preamble portion, that includes a plurality of preamble symbols, from the received signal;
partitioning the plurality of preamble symbols into a first sub-group having first plurality of preamble symbols, a second sub-group having a second plurality of preamble symbols, and a third sub-group having a third plurality of preamble symbols;
calculating a first sub-group carrier frequency offset average using the first plurality of preamble symbols;
calculating a second sub-group carrier frequency offset average using the second plurality of preamble symbols;
calculating a third sub-group carrier frequency offset average using the third plurality of preamble symbols;
calculating a first phase differential using the first sub-group carrier frequency offset average and the second sub-group carrier frequency offset average;
calculating a second phase differential using the second sub-group carrier frequency offset average and the third sub-group carrier frequency offset average; and
calculating a carrier frequency offset of the received signal using the first phase differential and the second phase differential.

17. The method of claim 16, further comprising:
modifying the plurality of preamble symbols using an expected plurality of preamble symbols before partitioning the now-modified plurality of preamble symbols into the first sub-group, the second sub-group, and the third sub-group.

18. The method of claim 16, further comprising:
receiving a plurality of signals transmitted via a plurality of communication channels.

19. The method of claim 16, further comprising:
optimizing a first number of preamble symbols within the first sub-group, a second number of preamble symbols within the second sub-group, and a third number of preamble symbols within the third sub-group based on a number of sub-groups into which the plurality of preamble symbols is being partitioned.

20. The method of claim 16, wherein:
the method is performed within a communication device;
the communication device is a burst receiver; and
the burst receiver is Data Over Cable Service Interface Specifications (DOCSIS) protocol compliant.

* * * * *